United States Patent [19]

Lin

[11] 4,221,708
[45] Sep. 9, 1980

[54] METHOD FOR POLYMERIZATION OF LIGNIN

[75] Inventor: Stephen Y. Lin, Mt. Pleasant, S.C.

[73] Assignee: Westvaco Corporation, New York, N.Y.

[21] Appl. No.: 933,284

[22] Filed: Aug. 14, 1978

[51] Int. Cl.$^2$ .............................................. C07G 1/00
[52] U.S. Cl. ................................................ 260/124 R
[58] Field of Search ...................... 260/124, 17.5; 8/83

[56] References Cited

U.S. PATENT DOCUMENTS

| | | | |
|---|---|---|---|
| 3,167,523 | 1/1965 | Dimitri | 260/17.5 |
| 3,784,493 | 1/1974 | Giguere et al. | 260/17.5 |
| 3,864,276 | 2/1975 | Benko et al. | 8/83 |
| 3,886,101 | 5/1975 | Felicetta et al. | 260/124 R |
| 4,045,421 | 8/1977 | Wenzel et al. | 260/124 R |
| 4,069,217 | 1/1978 | Detroit et al. | 260/124 R |

OTHER PUBLICATIONS

Chem. Abst., 88, 1978, p. 92017d.

*Primary Examiner*—Delbert R. Phillips
*Attorney, Agent, or Firm*—Terry B. McDaniel; Ernest B. Lipscomb, III

[57] ABSTRACT

Disclosed herein is a process for polymerizing technical lignins, hardwood as well as softwood and sulfonated as well as unsulfonated. The process involves the sequential treatment of the lignin material with formaldehyde and air (or oxygen) to increase the molecular weight. The lignin is first treated with from 0.5 to 3.5 moles of formaldehyde per 1,000 grams of lignin at a pH between 10.5 and 11.5 and a temperature from 50° C. to 80° C. for from 3 to 24 hours to form a lignin-formaldehyde adduct, preferably with minimum cross-linking of the lignin. Then, the thus formed lignin-formaldehyde adduct is oxidized at a temperature of from 25° C. to 80° C. with air or molecular oxygen for from 2 to 24 hours.

9 Claims, 2 Drawing Figures

NORMALIZED GEL PERMEAT CHROMATOGRAPHY CURVES OF
HARDWOOD KRAFT LIGNIN (D) AND DERIVATIVES (A−C)

POLYMERIZATION RATES OF THREE FORMALDEHYDE TREATED PINE KRAFT LIGNIN SAMPLES IN MILD OXIDATION WITH AIR

METHOD FOR POLYMERIZATION OF LIGNIN

BACKGROUND OF THE INVENTION (1) Field of the Invention

This invention relates to a method for polymerizing technical lignins. More particularly, this invention relates to a sequential treatment with formaldehyde and air (or molecular oxygen) to increase the molecular weights of said lignins.

(2) The Prior Art

Lignin, as it occurs in all woody plants, is a three-dimensional macromolecule consisting of rather hydrophobic phenylpropane units. Because of its structure and high molecular weight, lignin imparts rigidity to cell walls of woody tissues and gives an outstanding resistance of trees towards impact, bending and compression. In pulping processes for manufacture of wood pulps, lignin is chemically depolymerized and solubilized in pulping liquors to facilitate its removal from wood fibers. As a consequence, the molecular weights of technical lignins isolated from the pulping liquors are polydisperse and relatively low in comparison with that of native lignin in wood. For instance, there are many reports of molecular weights below 1,000; and values greater than 1,000,000 have been published for both lignosulfonates and alkali lignins. However, the average molecular weights are much lower than the reported maximum value, and range from 3,000 to 4,000 for pine or hardwood kraft lignin, and from 300 to 20,000 for spruce lignosulfonate.

That technical lignins, both alkali lignins and lignosulfonates, possess relatively low molecular weights, as compared with many commercially available synthetic polymers, is a significant limitation which hinders the use of said lignins in many application areas. For this reason, numerous methods are revealed in the prior art for polymerization of said lignins to increase their molecular weights. Thus, in U.S. Pat. No. 3,138,555 granted to King and Adolphson, an acid polymerization process is revealed for condensation of lignosulfonate components of spent sulfite liquor-derived solids, under controlled conditions, thereby increasing the effectiveness of lignosulfonates as dispersants in clay-water suspensions, such as drilling muds. In U.S. Pat. No. 3,864,276 to Benko and Daneault, useful dispersing agents are produced from mixtures of spent sulfite liquor solids and kraft liquor solids by treating said mixtures with air or formaldehyde as a cross-linking agent.

Brauns, *The Chemistry of Lignin,* 546–549, 1952, and Brauns and Brauns, *The Chemistry of Lignin,* Supplement Volume, 513–515, 1960, discuss the oxidation of lignin with oxygen or air in an alkaline medium. Generally, the oxidation of lignin disclosed in the prior art cited therein is aimed at degradation of the lignins to low molecular weight compounds, rather than condensation to high molecular weight compounds.

In U.S. Pat. No. 3,857,830, Briggs discloses a process for cross-linking lignin with a di-epoxide to increase its surface active properties and thus creating an improved flocculating agent. The process specifies as a cross-linking agent the use of di-epoxide having a molecular weight in the range of from 120 to 1,800 and to the extent of cross-linking that the phenolic content of the lignin has been decreased by from about 40% to 95%. Ludwig, in U.S. Pat. No. 3,850,799, describes a process whereby lignin is treated with a polyoxyalkylene diester of a monosulfonic acid or a polyoxyalkylene dihalide to obtain high molecular weight compositions which are effective as thickening and flocculating agents.

In those use areas wherein lignin is incorporated into elastomers such as rubbers, to achieve reinforcement effect, lignin has been invariably treated in a manner that the thermal properties of lignin are improved substantially. The increase in heat resistance of lignin resulting from the reaction with formaldehyde is taught by Ball in U.S. Pat. No. 3,312,643. In U.S. Pat. No. 2,610,954, Raff and Tomlinson disclose a treatment of lignin with hot air whereby the melting point of alkali lignin is increased from less than 220° C. to over 300° C., improving the reinforcing properties of said lignin, when incorporated into natural and/or synthetic rubbers. It is known now that mild oxidation with air is an effective means for increasing the molecular weight of lignin.

In terms of reactive sites of lignin wherein a cross-linking reaction occurs, methods for polymerizing the lignin may be classified into two types:

(1) cross-linking or bridging of lignin molecules by reacting free phenolic hydroxyl groups with bifunctional chemicals (hereafter termed phenolic polymerization); and (2) condensing of lignin units at other non-phenolic sites (hereafter termed non-phenolic polymerization).

In phenolic polymerization, lignin units are cross-linked by blocking the free phenolic hydroxyl groups with halogen- or epoxide-containing agents such as epichlorohydrin, di-epoxide and polyoxyalkylene dihalide. This type of polymerization reaction obviously shows three disadvantages:

(1) It requires relatively expensive cross-linking chemicals;

(2) blocking of phenolic hydroxyl groups reduces the solubility of lignin in alkaline aqueous systems and thus greatly increases the viscosity of reaction media; and (3) lignin becomes inactivated in many modification reactions which need free phenolic hydroxyl groups.

On the other hand, non-phenolic polymerization of lignin does not render free phenolic hydroxyl groups unavailable for further reactions; and it yields a polymerized lignin soluble in alkaline media. The most useful non-phenolic polymerization processes of lignin include treatments with formaldehyde or air as already mentioned in above-cited patents. The mechanisms of these treatments in condensing lignin structures have been well elucidated in the prior art. A treatment of lignin with formaldehyde gives rise to the formation of biphenyl methylene linkages, and mild oxidation with air (or molecular oxygen) generates free radical intermediates which combine to form a biphenyl structure. Both biphenyl methylene linkage and biphenyl structure are responsible for increase in molecular weights of lignin. It should be pointed out that the cross-linking mechanisms in formaldehyde treatment or air oxidation require free ortho position (to phenolic hydroxyl groups) in a lignin aromatic unit. Consequently, these non-phenolic polymerization methods are not effective for increasing the molecular weight of hardwood technical lignins which contain a large number of syringyl units.

It is accordingly a principal object of this invention to provide an economical method for obtaining high molecular weight technical lignins.

It is an additional object of this invention to provide a method for polymerization of lignin using formaldehyde and air as the cross-linking agents.

It is still an additional object of this invention to provide a simple process for condensing hardwood lignins.

A further object of this invention is to provide a method for polymerizing lignins whereby free phenolic hydroxyl groups of lignin are not blocked.

Other objects, features and advantages of the invention will be clear from the following detailed description of the invention.

SUMMARY OF THE INVENTION

A two-step method for polymerizing technical lignin is disclosed comprising, first, treating the lignin with from 0.5 to 3.5 moles of formaldehyde per 1,000 grams of lignin at a pH between 10.5 and 11.5 and a temperature from 50° C. to 80° C. for from 3 to 24 hours to form a lignin-formaldehyde adduct, preferably with minimum cross-linking of the lignin. Then, the thus formed lignin-formaldehyde adduct is oxidized at a temperature of from 25° C. to 80° C. with air or molecular oxygen for from 2 to 24 hours. The invention process results in a substantial increase in the molecular weights of the technical lignin, whether hardwood or softwood derived.

DETAILED DESCRIPTION OF THE INVENTION

Figure 1:
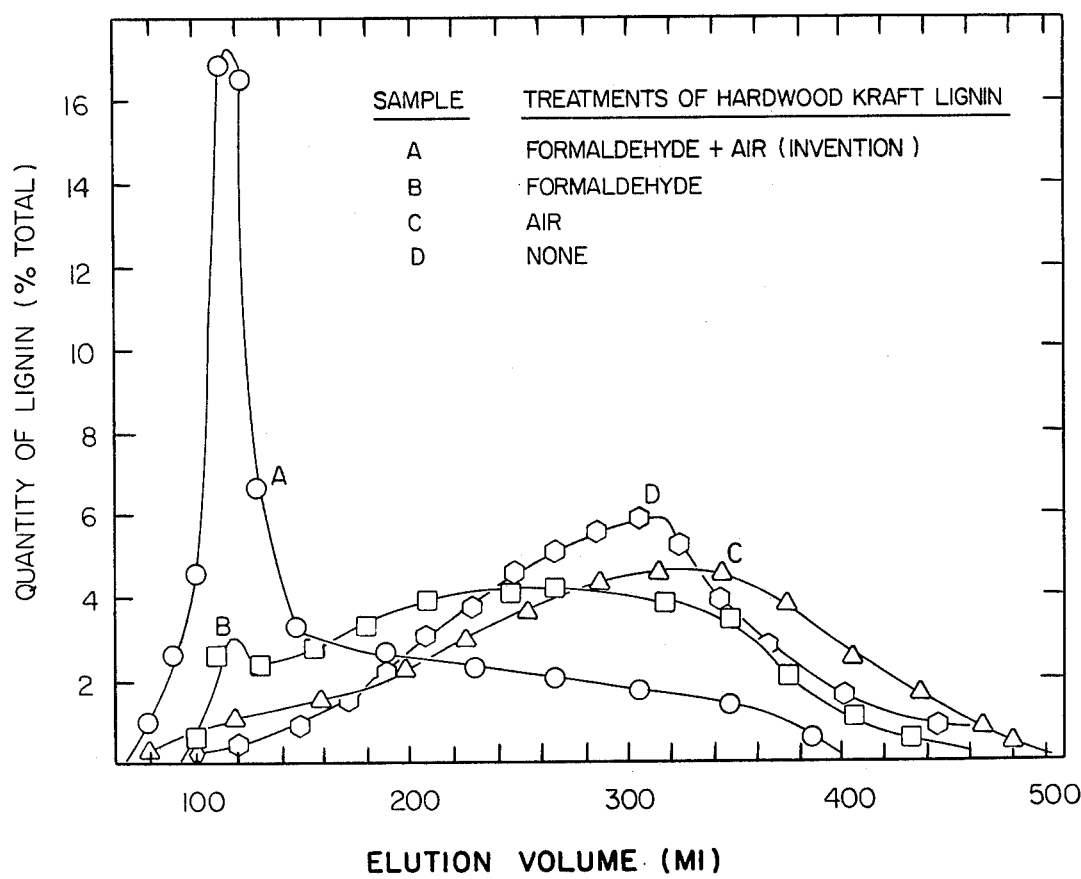
FIG. 1 shows the normalized gel permeation chromatography curves of hardwood kraft lignin and derivatives obtained according to the prior art and the invention polymerization methods.

The method of the invention is based on the unexpected discovery that hardwood kraft lignin containing syringyl moieties which are not usually condensed to a significant degree when treated with formaldehyde or air alone, can be polymerized readily by treating the lignin with formaldehyde and subsequently with air (or molecular oxygen). The method of the invention involves the treatment of lignin with 0.5 to 3.5 moles formaldehyde per 1,000 grams of lignin, preferably 1.5 to 2.5, at a pH between 10.5 to 11.5, and a temperature between 50° C. to 80° C., preferably 60° C. to 70° C., for 3 to 24 hours, preferably for 3 to 10 hours, to form a lignin-formaldehyde adduct. Treatment with formaldehyde under extreme conditions, i.e., at the upper end of the ranges of amount formaldehyde, pH, temperature and reaction time, may result in a small, but ineffective amount of cross-linking. However, treatment with formaldehyde under conditions whereby one or more of the reaction parameters are within the preferred range will avoid condensation of the lignin. A subsequent oxidation of the adduct with air or molecular oxygen under mild conditions for from 2 to 24 hours affords a polymerized lignin product of high molecular weight. The oxidative reaction is effected by simply bubbling air through the lignin-formaldehyde adduct solution, or it can be carried out under air pressure in a closed reactor to speed up the polymerization process. Prior to oxidation, the pH of lignin solution is adjusted to 10.5 to 11.5. The oxidation temperature may be any convenient temperature between room temperature, i.e., 25° C. to but not over 80° C. Under the mild oxidation conditions, quantitative yields of condensed lignin are obtained and no material loss occurs due to oxidation of lignin to low molecular weight aliphatic carboxylic acids.

For the purposes of the present invention, gel permeation chromatography is employed to determine the molecular weight distribution of lignin. The theory of gel permeation chromatography is described in numerous texts, e.g., *Gel Chromatography*, by H. Determann, Springer-Verlag New York Inc., 1968. In essence, it is a technique whereby macromolecules of different size (or molecular weight) are separated in homogeneous gels, which is eluted with a suitable solvent. In practice, gel grains, together with the solvent, are poured into a vertically mounted glass tube. The macromolecular compounds are added to the top of the gel-filled tube. Upon washing with the solvent, only the molecules in outer volume are transported. The large molecules are moving faster than the small ones which are retarded due to the temporary diffusion into the interior of the gel phase. If the mixture contains also solutes of medium size, in the state of diffusion equilibrium, these would enter only a certain portion of the gel phase. The components of the macromolecules will leave the glass tube filled with gel particles in the order of decreasing molecular weight and corresponding to the hold-up time in the stationary gel phase which in turn is dependent on diffusion of solute. In this fashion, using a commercial gel, such as Sephadex G-100, as the separating medium and pH 10 buffer as the solvent, gel chromatography curves of lignin products are obtained, showing the quantity of lignin eluted at various lengths of time or elution volume. The quantity may be expressed as percent of total lignin and the curves are then termed "normalized gel permeation chromatography curves." Normalization of curves makes it possible to directly compare the molecular weight distribution of different lignin products.

The advantage of the invention for polymerization of hardwood kraft lignin is illustrated in FIG. 1 which shows the molecular weight distributions of said lignin and its derivatives produced by treating it with formaldehyde or air by methods of the prior art, and by the present invention. As shown, the treatment with formaldehyde increases only slightly the molecular weight; whereas, the method of this invention is able to polymerize the lignin effectively. Mild air oxidation, on the other hand, decreases the molecular weight substantially. The mechanism of polymerization of hardwood lignin according to this invention is not well understood. However, without wishing to be limited as to theory, it may be assumed that mild oxidation with air creates free radical intermediates in the lignin-formaldehyde adduct; and subsequent condensation of the intermediates leads to polymerization of lignin.

As stated above, the non-phenolic polymerization methods, air oxidation and formaldehyde treatment, are capable of condensing softwood technical lignins which contain mainly guaiacyl moieties having free ortho positions adjacent to phenolic hydroxyl groups. Again, the mechanisms of this type of condensation reactions are known to the prior art. It is a surprising discovery that according to the invention a sequential treatment with formaldehyde and air is more effective than the prior art methods in polymerizing softwood lignins.

Figure 2:
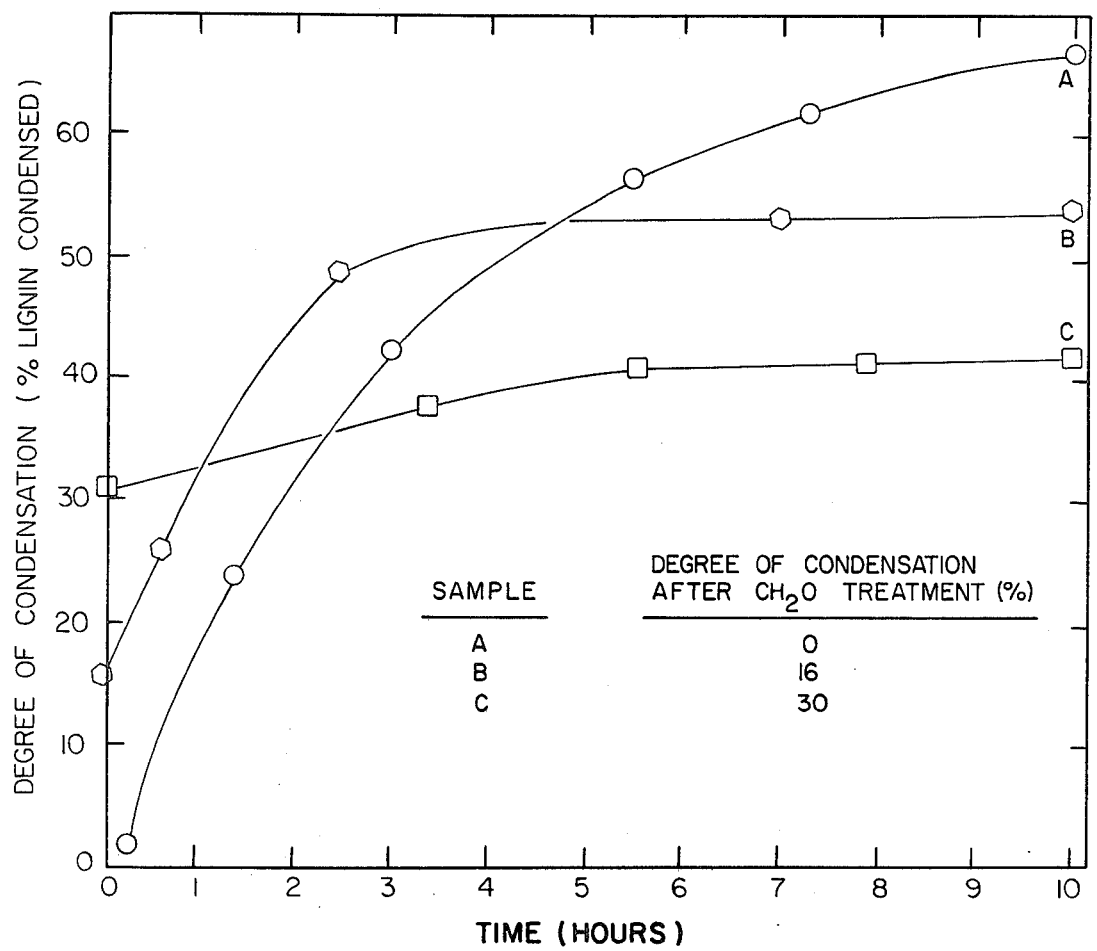
FIG. 2 shows the polymerization rates of three formaldehyde treated pine lignin samples in mild oxidation with air.

To maximize polymerization, according to the invention, said softwood lignins are preferably treated with formaldehyde under mild conditions and in such a manner that no lignin condensation occurs. If condensation does occur during the formaldehyde treatment, the ultimately achievable degree of condensation in the subsequent oxidation step is greatly reduced. By the term "degree of condensation," it is meant for the purposes of the invention, the weight percent of a condensed lignin which exhibits higher molecular weights than the uncondensed counterpart. For example, to calculate the degree of condensation of lignin A in FIG. 1, simply subtract Curve D (hardwood kraft lignin) from Curve A to get a difference curve. The sum of positive values in the low elution volume range, i.e., 80 to 200 milliliters, is the degree of condensation. FIG. 2 shows the polymerization rates of three formaldehyde-treated pine kraft lignin samples in air oxidation. It is seen herein that the rate of polymerization and ultimate degree of condensation vary to a great extent depending on the degree of condensation occurring during formaldehyde treatment.

The method of polymerization revealed herein is useful and effective for condensing all technical lignins. By the term "technical lignin," it is meant any lignin derived from pulping processes, in contrast to lignins isolated by some laboratory procedures, such as milled wood lignin, Klason lignin and dioxane lignin. Thus, technical lignins include alkali lignins from the kraft pulping process, soda or modified soda processes, and sulfonated lignins such as sulfite lignins from acid and neutral processes, or sulfonated alkali lignins.

Alkali lignins are usually recovered from black liquor as water-insoluble products by acidification and precipitation procedures. Lignin obtained from the kraft, soda or other alkaline processes is not recovered as a sulfonated product, but may easily be sulfonated, if desired, by reacting the product with a bisulfite or sulfite.

In the sulfite pulping process, the lignocellulosic material is digested with a bisulfite or sulfite to obtain a sulfonated black liquor wherein the sulfonated lignin is dissolved. There are several methods of isolating this sulfonated lignin from the other black liquor components, such as carbohydrates and inorganic materials. One method is to precipitate sulfonated lignin as its calcium salt and recover the lignosulfonic acid by addition of sulfuric acid to the calcium salt; thereby, calcium is recovered as calcium salt.

By the term "sulfonated lignin," it is meant any lignin containing at least an effective amount of sulfonate groups to solubilize the lignin in water at neutral or acidic conditions. This includes lignins from the sulfite process and sulfonated alkali lignins. Any of the sulfonated lignins may contain up to 50% of the other materials, such as carbohydrates, phenols and other organic or inorganic compounds. The presence of these materials results in larger consumption of formaldehyde and air oxygen; therefore, some purification of the lignin starting materials is often desirable.

The practice of this invention is clearly illustrated by the following examples.

EXAMPLE 1

Softwood kraft lignin, 200 grams in 800 milliliters of water, was adjusted to pH 11 with sodium hydroxide and heated at 75° C. in a pressure reactor under an air pressure of 200 psig. The viscosity of the lignin solution increased rapidly with oxidation time. No viscosity increase was observed when hardwood kraft lignin was oxidized in the same manner (see Table I). Gel permeation chromatography of the oxidized lignins showed that upon oxidation for 420 minutes, the molecular weight of softwood lignin was greatly increased, whereas that of hardwood lignin shows only slight changes. The normalized gel permeation chromatography Curve C of FIG. 1 represents the thus oxidized hardwood kraft lignin.

TABLE I
VISCOSITY OF OXIDIZED SOFTWOOD AND HARDWOOD KRAFT LIGNINS

| Oxidation Time | Viscosity (cps.) | |
| --- | --- | --- |
| (minutes) | Softwood | Hardwood |
| 0 | 7 | 4 |
| 50 | 8 | 4 |
| 100 | 17 | — |
| 125 | — | 4 |
| 200 | 29 | — |
| 300 | 78,000 | 4 |
| 420 | gel | 4 |

EXAMPLE 2

Hardwood kraft lignin, 400 grams in 1,600 milliliters of water, was adjusted to pH 11 with sodium hydroxide and heated with 36 grams of formaldehyde (in the form of paraformaldehyde) at 75° C. for one hour, and then at 100° C. for two hours. The final pH of the lignin solution was 10.9, and viscosity was 8 cps. at 25° C. Titration with sodium sulfite indicated 99% of added formaldehyde was consumed. A sample solution was fractionated on a column of Sephadex G-100 gel produced by Pharmacia Fine Chemicals, Inc., using a pH 10 buffer as the eluant. Fractions each of 10-milliliter volume were collected and absorbance thereof at 280 nm. measured. The absorbance value was taken to represent the quantity of lignin. GPC curve of this sample (Curve B of FIG. 1) shows that formaldehyde treatment does not effectively increase the molecular weight of the hardwood lignin.

EXAMPLE 3

The formaldehyde treated hardwood lignin from Example 2 was oxidized at 75° C. in a pressure reactor under an air pressure of 200 psig. for 180 minutes whereupon the lignin gelled. The molecular weight distribution curve of the product (Curve A of FIG. 1) shows it to be a highly condensed lignin, degree of condensation being about 57%.

Examples 1, 2 and 3 and FIG. 1 present evidence for the conclusion that neither formaldehyde nor air treatments are effective for polymerizing hardwood kraft lignin, yet the sequential treatment of lignin with formaldehyde and air is capable of condensation said lignin to a great extent.

EXAMPLE 4

This example compares the effectiveness of two prior art methods and the invention for polymerizing softwood kraft lignin. Thus, a 5% solution of said lignin was treated as follows:

A. Prior art method—The lignin solution at pH 11 was oxidized in a pressure reactor under an air pressure of 200 psig.

B. Prior art method—The lignin solution at pH 11 was treated with a quantity of formaldehyde corresponding to 3 moles per 1,000 grams of lignin at 85° C.

C. Invention method—The lignin solution at pH 11 was first heated at 60° C. with 3 moles of formaldehyde per 1,000 grams of lignin for 4 hours. The solution of lignin-formaldehyde adduct exhibited a pH value of 10.45 and zero degree of condensation. The pH value was raised to 11 prior to air oxidation. The oxidation step is performed as in Method A.

Table II shows the polymerization rates of the three methods. It is obvious from the data that the invention method is a more effective condensation process than the other two methods.

TABLE II

POLYMERIZATION RATES OF PRIOR ART AND THE INVENTION METHODS

| Time (min.) | Degree of Condensation* (%) | | |
|---|---|---|---|
| | Method A | Method B | Method C |
| 40 | 8 | 2 | 10 |
| 80 | 15 | 7 | 23 |
| 120 | 25 | 11 | 31 |
| 160 | 29 | 15 | 38 |
| 240 | 38 | 18 | 47 |
| 320 | 39 | 19 | 54 |
| 400 | 38 | 20 | 60 |

*Degree of condensation is percent by weight of condensed lignin which exhibits higher molecular weight than the uncondensed counterpart; estimated from normalized gel permeation chromatography curves.

EXAMPLE 5

This example illustrates the effect of formaldehyde treatment on oxidative polymerization of lignin. Softwood kraft lignin, 200 grams in 800 milliliters of water, was adjusted to pH 11 with sodium hydroxide, and heated with 3 moles of formaldehyde per 1,000 grams of lignin at a temperature of 60° C. to 85° C. Thus, formaldehyde-reacted lignin samples, 1, 2 and 3, were produced having a degree of condensation of 0, 15, and 30%, respectively. The samples were then oxidized with air as in Example 3. Table III shows the polymerization rates of the lignins during mild air oxidation. The data clearly shows that to maximize the degree of condensation (D. C.) in air oxidation, the formaldehyde treatment of lignin should be conducted in a manner so that no condensation occurs. It is accordingly a unique feature of the invention to specify the mild conditions of formaldehyde treatment for forming a lignin-formaldehyde adduct prior to the oxidative polymerization (see FIG. 2 of the drawings). The data in FIG. 2 also provide evidence against any misinterpretation that Method C (Table II) is simply a summation of Methods A and B. The invention process for condensing lignin must involve a new reaction mechanism.

TABLE III

EFFECT OF DEGREE OF CONDENSATION OF LIGNIN IN FORMALDEHYDE TREATMENT ON THE RATE OF SUBSEQUENT OXIDATIVE POLYMERIZATION

| Time of Oxidation (hrs.) | Degree of Condensation in Air Treatment (%) | | |
|---|---|---|---|
| | Sample 1 | Sample 2 | Sample 3 |
| 0* | 0 | 15 | 30 |
| 1 | 15.5 | 32 | 32 |
| 2 | 31 | 43.5 | 34 |
| 4 | 47 | 50 | 38 |
| 6 | 56 | 51 | 40 |
| 8 | 61 | 52 | 41 |
| 10 | 65 | 52.5 | 41 |

*The degree of condensation at zero oxidation time represents the value after formaldehyde treatment.

EXAMPLE 6

This example compares the effectiveness of two prior art methods and the invention for polymerizing a sulfonated softwood kraft lignin (Polyfon O). Thus, a 5% solution of said lignin was treated by Methods A, B and C of Example 4.

Table IV shows that the polymerization rate of the lignin by the invention method (C) is greater than that of the prior art methods (A and B).

TABLE IV

POLYMERIZATION RATES OF A SULFONATED LIGNIN BY PRIOR ART AND THE INVENTION METHODS

| Time (min.) | Degree of Condensation* (%) | | |
|---|---|---|---|
| | Method A | Method B | Method C |
| 50 | 7 | 0 | 9 |
| 100 | 21 | 6 | 30 |
| 150 | 27 | 12 | 35 |
| 200 | 32 | 15 | 44 |
| 250 | 35 | 20 | 48 |
| 300 | 35 | 22 | 62 |

*Estimated from normalized gel permeation chromatography curves.

While this invention has been described and illustrated with specific examples and descriptions, it is understood that the invention is not to be limited to the exact details of operation or exact components shown and described herein, as obvious modifications will be apparent to those skilled in the art; and the invention is, therefore, to be limited only by the scope within the claims.

What is claimed is:

1. A two-step method for polymerizing technical lignin comprising;
    (a) treating the lignin with from 0.5 to 3.5 moles of formaldehyde per 1,000 grams of lignin at a pH of from 10.5 to 11.5, and a temperature from 50° C. to 80° C. for 3 to 24 hours to form a lignin-formaldehyde adduct, and
    (b) oxidizing the lignin-formaldehyde adduct at a temperature from 25° C. to 80° C. with air or molecular oxygen for 2 to 24 hours.

2. The method of claim 1 wherein the technical lignin is a sulfonated lignin.

3. The method of claim 1 wherein the technical lignin is an alkali lignin.

4. The method of claim 3 wherein the alkali lignin is a hardwood kraft lignin.

5. The method of claim 3 wherein the alkali lignin is a softwood kraft lignin.

6. The method of claim 1 wherein the lignin treated with formaldehyde in step (a) is not cross-linked.

7. The method of claim 1 or 6 wherein the formaldehyde is employed in the amount of 1.5 to 2.5 moles per 1,000 grams of lignin.

8. The method of claim 1 or 6 wherein the temperature is from 60° C. to 70° C.

9. The method of claim 1 or 6 wherein the treatment with formaldehyde of step (a) is for 3 to 10 hours.

* * * * *

UNITED STATES PATENT AND TRADEMARK OFFICE
CERTIFICATE OF CORRECTION

PATENT NO. : 4,221,708
DATED : September 9, 1980
INVENTOR(S) : Stephen Y. Lin

It is certified that error appears in the above-identified patent and that said Letters Patent are hereby corrected as shown below:

In Sheet 1 of 2 of Fig. 1 of the drawings, in the first line of the caption to the figure, "NORMALIZED GEL PERMEAT CHROMATOGRAPHY CURVES OF" should read --NORMALIZED GEL PERMEATION CHROMATOGRAPHY CURVES OF--.

In column 6, line 53, "condensation" should read --condensing--.

Signed and Sealed this

Third Day of March 1981

[SEAL]

Attest:

RENE D. TEGTMEYER

Attesting Officer

Acting Commissioner of Patents and Trademarks